United States Patent [19]
Paulus

[11] 4,114,493
[45] Sep. 19, 1978

[54] CUTTING DEVICE WITH ROTATING CUTTERS

[75] Inventor: Helmut Paulus, Herzogenrath, Fed. Rep. of Germany

[73] Assignee: Saint-Gobain Industries, Neuilly-sur-Seine, France

[21] Appl. No.: 778,259

[22] Filed: Mar. 16, 1977

[51] Int. Cl.² .............................................. B27B 3/04
[52] U.S. Cl. ...................................... 83/488; 83/594; 83/848
[58] Field of Search ...................... 56/13.6, 13.7, 13.8; 83/488, 487, 469, 471, 471.1, 471.2, 594, 595, 848

[56] References Cited

U.S. PATENT DOCUMENTS

| 1,656,105 | 1/1928 | Durkee | 56/13.6 |
| 2,038,284 | 4/1936 | Hanson | 56/13.6 |
| 2,188,110 | 1/1940 | Fahnestock | 56/13.6 |
| 2,243,303 | 5/1941 | Wells | 83/488 X |
| 3,545,184 | 12/1970 | Liepold et al. | 56/13.7 |
| 3,596,445 | 8/1971 | Lievers | 56/13.7 |
| 4,024,785 | 5/1977 | Jansen-Herfeld | 83/848 |

*Primary Examiner*—J. M. Meister
*Attorney, Agent, or Firm*—M. Richard Page; John T. Synnestvedt

[57] ABSTRACT

A cutter for cutting continuous stock materials into discrete lengths is disclosed. The cutting device includes a plurality of rotatable cutting tools or blades extending transversely across a cutting zone. The cutting tools are mounted in a common plane, are intermeshed, and are synchronously driven in opposite directions. The cutting zones of the intermeshed cutting tools overlap and thus the cutting device is capable of performing the cutting operation by movement in one direction through the material being cut. The cutting tools have opposed segments that carry cutting edges. In one form of tool, the cutting edges are spaced from the axis of rotation of the cutting tool by a distance that continuously increases in a direction opposite the direction of rotation of the cutting tool. This change in distance can be related to the speed of rotation of the cutting tools and the speed at which the cutting tools are advanced through the material being cut.

10 Claims, 3 Drawing Figures

CUTTING DEVICE WITH ROTATING CUTTERS

BACKGROUND OF THE INVENTION

This invention relates to cutting devices and particularly devices for severing continuous lengths of stock material into shorter length pieces. The invention has utility with respect to many materials, but has particular utility with respect to mineral fiber mats or boards and therefore, the invention will hereinafter be described in that environment.

As is known, mats or boards of agglomerated mineral fibers, usually incorporating a binder, are manufactured in continuous processes. For shipment or other subsequent handling, it is necessary to sever or cut the mat transversely of its direction of movement so that sections of mat or predetermined lengths are produced. It should be understood that the mat or board usually is substantially continuous across its width and it is necessary to cut through substantially the entire mat in order to produce acceptable pieces.

Heretofore, cutters of the so-called "flying" type have been utilized for cutting glass fiber mat or board. These cutters move longitudinally in the direction of the traveling mat or board during the cutting operation. This longitudinal movement is necessary because the duration of the cutting operation is relatively long in comparison with the lineal speed of the product being cut, so that problems would occur upstream of the cutting operation if the cutter did not move with the mat. Previously, these flying cutters employed such means as a guillotine type blade for shearing the mat or a saw blade for example, a bandsaw blade, extending transversely of the mat or board for cutting it.

Also, cutting devices employing a number of rotating knives, saws, or separating discs, arranged in a common plane, on a moveable beam or support member, are suitable for cutting continuous length materials in the form of relatively narrow strips. However, with such an arrangement, there is always an area or zone between adjacent cutting elements that is not acted upon by either cutting element. Thus, if such an arrangement were to be utilized to cut material having a substantially constant cross-section through the cutting zone, as for example a mineral fiber mat or board, the cutting operation could not be accomplished by merely advancing the cutting elements in one direction through the mat; it would be necessary also to move them in a direction transverse to the mat in order to sever it completely. This additional transverse movement of the cutting device is disadvantageous because it increases the cost of the device and it increases the duration of the cutting operation.

SUMMARY OF THE INVENTION

According to the invention herein disclosed and claimed, a cutting device employing rotation cutting tools and requiring advancement of the cutting element through the material cut in only one direction is achieved. As a result, the construction of the device is simplified (with attendant reduction in cost), and the cutting speed is increased. This is achieved by the use of a plurality of rotatable disc-like cutting or parting tools that have opposed vanes or segments. The cutting tools are arranged in intermeshed relationship in a common plane on a supporting element and are synchronously driven, with adjacent tools rotating in opposite directions, without interference or touching of one tool with another.

As adjacent cutting elements are intermeshed, the area or zone not covered by or subject to the cutting action of the cutting tools is reduced so that transverse movement of the cutting tools, i.e., movement across the material being cut, is unnecessary.

Rotating cutting tools having three, four, or more segments or vanes may be used. However, it is particularly advantageous to utilize tools having two opposed segments, whereby the cutting element has a substantially figure-eight shaped configuration. With adjacent cutting elements of this configuration angularly offset from each other by 90°, the area that is not subject to cutting action is reduced to a minimum.

The cutting tools may be circular. However, it has been found to be particularly advantageous to employ a configuration in which the tip of the trailing edge of each segment or vane is spaced a greater distance away from the axis of rotation of the cutting tool than the tip of the leading edge of that vane. the distance of the cutting edge from the axis of rotation of the tool increases continuously in a direction opposite to the direction of rotation of the tool. This change in distance may be interrelated to the speed of the stroke of the cutting device and the rotational speed of the cutting elements so that the cutting depth of the trailing edge of the vane corresponds to the cutting depth of the leading edge of the following vane, when that vane reaches the cutting position.

The cutting device may be mounted on a support that is capable of moving longitudinally, in the direction of the moving material, so that the cutting device can travel at substantially the same speed as the material, during the cutting operation.

DESCRIPTION OF THE PREFERRED EMBODIMENT

For purposes of simplicity of description, in the attached drawings, the cutting device is shown as being mounted on a sationary support, i.e., one in which the cutting device does not move in the direction of the advancing material that is being cut. However, it should be realized that it is particularly advantageous to mount the cutting device on a support that can move in the same direction and at substantially the same speed as the material being cut, so that the cutting process can take place without interrupting the continuous manufacture of the material being cut. Such supports that move with the material are known and have been used for prior-known cutting devices of the flying shear and flying saw type. As such arrangements are widely known, it is not seen to be necessary to include further details of their construction in this application.

Figure 1:
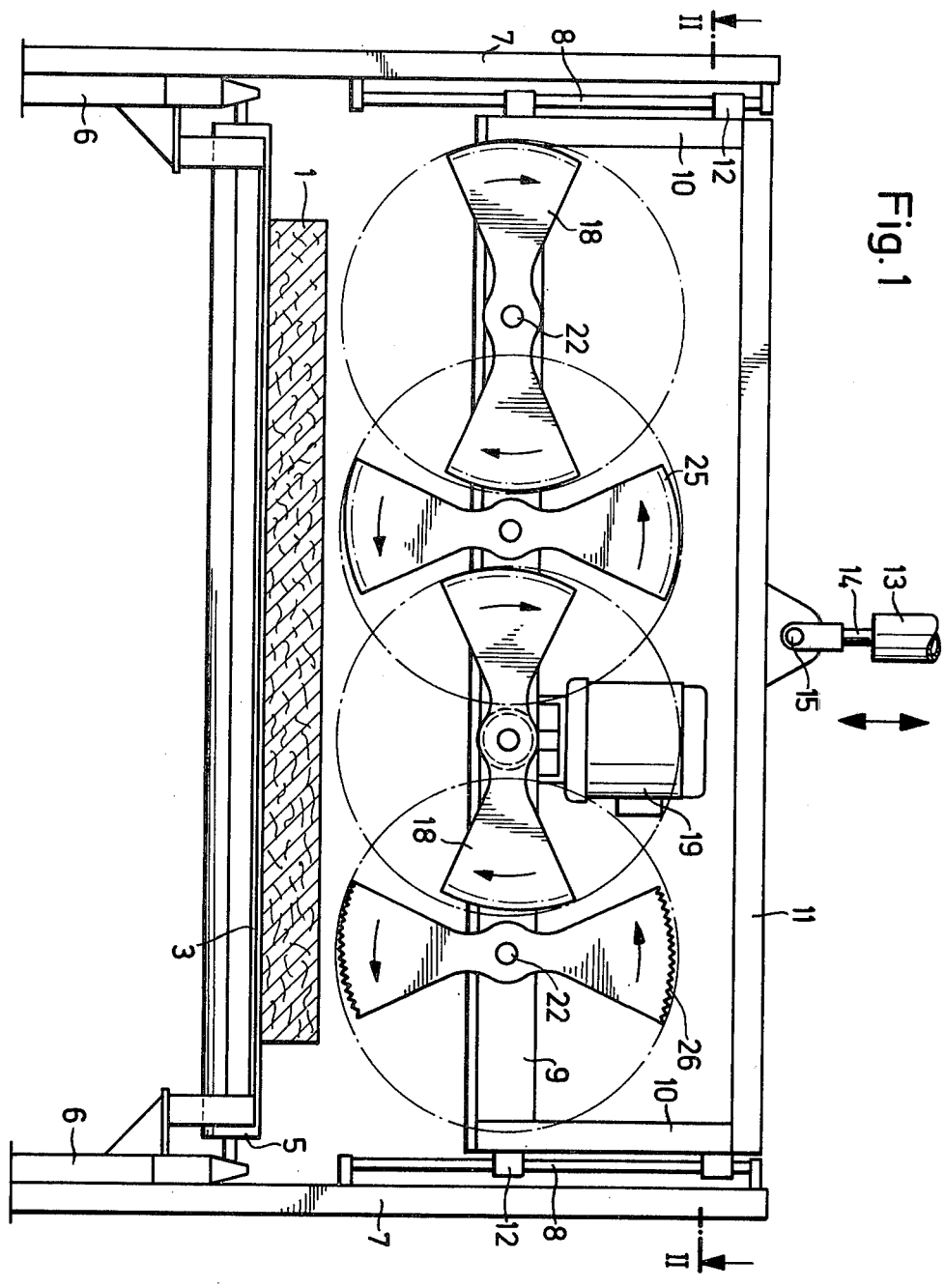
FIG. 1 is a transverse elevational view of a cutting device mounted in position relative to a glass fiber mat and a conveyor for the mat.

Referring to FIG. 1, the mineral fiber mat or board 1 which is to be cut, is transported on a conveyor, for example a roller conveyor, to the area or zone in which the cutting takes place. In this cutting area, there is a plate 3 which is interrupted or slotted in the area immediately beneath the rotating cutting elements or tools, so that the edges of the cutting tools can pass below the top surface of the plate 3. The transport rollers 5 of the conveyor and the plate 3 are mounted on the stand 6.

Also mounted on the stand 6 are vertical supports 7, to which are attached vertical slide rails 8. A cutting bridge comprises a housing or support means 9 that is mounted on a frame comprising opposed members 10 and cross member 11. The frame is mounted for vertical movement on the slide rails 8 by slide bearings 12. In order to carry out a cutting operation, the cutting bridge is lowered by suitable means, for example, an hydraulic cylinder 13, that acts on the frame member 11 through rod 14 and clevis joint 15. When the cutting operation is completed, the bridge is lifted to its initial position by the hydraulic cylinder 13.

Figure 2:
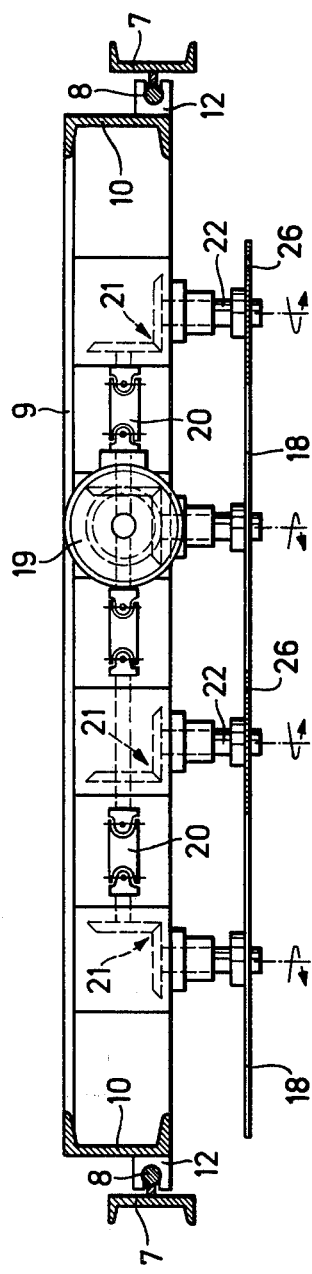
FIG. 2 is a top view, partially in section, taken along line II—II in FIG. 1.

A preferred system for driving the cutting tools is shown in FIG. 2. A suitable drive means, for example electric motor 19 is mounted on the housing 9. The motor 19 drives Cardan shaft 20 that is mounted for rotation in housing 9. The tools 18 are mounted on stub shafts 22 that are driven synchronously by Cardan shaft 20 and bevel gear sets 21. The bevel gear sets are arranged so that adjacent stub shafts rotate in opposite directions.

As illustrated in FIG. 2, a plurality of cutting tools 18 are rotatably mounted on housing 9 for rotation in a common plane. Also, as shown in FIG. 1, the cutting tools 18 are mounted in intermeshed relationship, that is, the zone or area swept by one of the cutting tools 18 overlaps the area swept out by an adjacent cutting tool. Also, as shown in FIG. 1, the preferred form of cutting tools 18 have a figure-eight shape of the vanes and adjacent cutting tools are angularly displaced or offset with respect to each other by 90° so that each of the vanes passes through a space not then occupied by portions of an adjacent cutting tool. By reason of the shape and spacing of the cutting tools and the synchronous drive system shown, adjacent tools are prevented from coming into contact with each other. Thus it can be seen with reference to FIG. 1 that as the cutting bridge is lowered toward the mat 1, the cutting tools sever the mat and, as the zones of action of adjacent cutting tools overlap, the mat is severed through substantially its entire cross section. Depending upon the length of the stroke of the cutting bridge, small gusset areas of unsevered material disposed between adjacent blades may be left uncut, but these areas are reduced to a minimum.

For cutting mineral fiber mats or boards, a cutting tool of the type shown is formed of a high grade steel and the cutting edges 25 are provided with teeth 26, as in the manner of a circular saw blade. However, it should be noted that the cutting tool may be formed of other suitable materials and may employ other severing elements on the cutting elements, for example, diamond chips.

Figure 3:
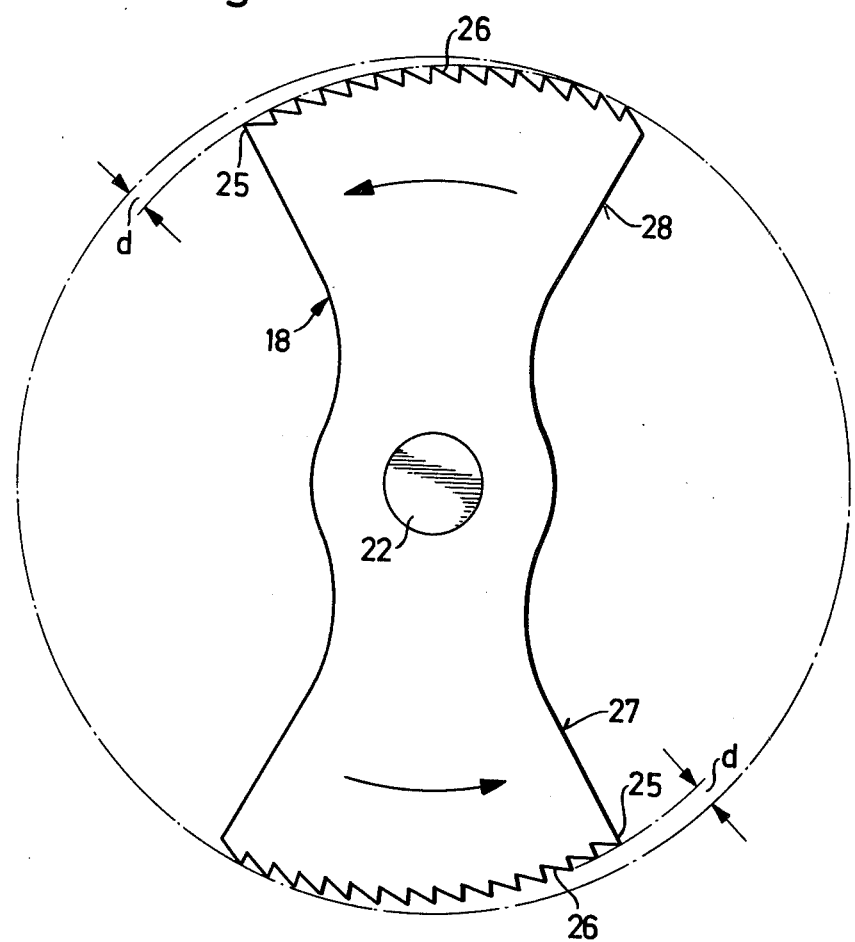
FIG. 3 is a detailed view of a preferred form of cutting tool.

FIG. 3 shows a form of cutting tool that is noncircular in configuration. It should be further noted that the arrows in FIG. 3 indicate the intended direction of rotation of the cutting tool. In this embodiment, the distance of a tooth on the leading edges 27 of each of the vanes from the axis of rotation or center of the tool is less than distance of a tooth on the trailing edge 28 of a vane from the axis of rotation of the cutting tool by a distance represented by the dimension d. The distance d decreases continuously from the leading edge of a vane to its trailing edge. The distance d is preferably interrelated to the speed of advance of the cutting bridge toward the material being cut and the rotational speed of the cutting tools so that the depth of cut resulting from the tooth on the trailing edge 28 of a vane corresponds to the cutting depth that is reached by the leading edge of the next successive vane. Thus, when the next successive vane is in cutting position, the cutting bridge has been lowered by a distance d. This ensures a more uniform cutting.

I claim:

1. Cutting apparatus comprising
a support means,
a plurality of rotatable cutting tools,
means mounting the cutting tools on the support means for rotation in a common plane,
each cutting tool having a plurality of segments, each segment carrying a cutting edge including saw teeth, the distance of each cutting edge from the axis of rotation of an associated cutting tool increasing from the leading edge of each segment to the trailing edge of the segment,
the cutting tools being arranged with segments of adjacent cutting tools being angularly displaced with respect to each other and in intermeshing relationship wherein cutting edges of adjacent cutting tools pass through a common zone,
and drive means for synchronously driving the cutting tools to prevent contact of adjacent cutting tools.

2. Cutting apparatus comprising
a frame defining a zone for receiving a moving length of material to be cut,
a bridge,
means mounting the bridge on the frame for movement toward and away from said zone, transversely of the direction of movement of the material to be cut,
means for moving the bridge toward and away from said zone,
a plurality of rotatable cutting tools,
means mounting said plurality of cutting tools on the bridge for rotation in a common plane, said common plane being arranged transversely with respect to the direction of movement of the material,
the cutting tools being arranged with segments of adjacent cutting tools being angularly displaced with respect to each other and in intermeshing relationship wherein cutting edges of adjacent cutting tools pass through a common zone,
and drive means for synchronously driving the cutting tools to prevent of adjacent cutting tools.

3. Apparatus as in claim 2 wherein the drive means includes means for rotating adjacent cutting tools in opposite directions.

4. Apparatus as in claim 2 wherein the cutting tools are in the form of two diametrically opposed segments.

5. Apparatus as in claim 4 wherein adjacent cutting tools are angularly displaced from each other by 90°.

6. Apparatus as in claim 2 wherein the distance of each cutting edge from the axis of rotation of an associated cutting tool increases from the leading edge of each segment to the trailing edge of the segment.

7. Apparatus as in claim 6 wherein the distance that the cutting edge increases ffrom the axis of rotation of the cutting tool, between the leading and trailing edges of the segment, is interrelated to the speed of rotation of the cutting tool and the speed at which bridge moving means urges the bridge toward the material being cut.

8. Apparatus as in claim 7 wherein the cutting elements comprise two diametrically opposed sectorshaped segments, each segment including a cutting edge.

9. Apparatus as in claim 8 wherein the cutting edges are toothed.

10. Apparatus as in claim 2 and further comprising conveyor means for conveying the material to be cut in a direction transverse to the plane of the cutting tools.

* * * * *

UNITED STATES PATENT AND TRADEMARK OFFICE
CERTIFICATE OF CORRECTION

PATENT NO. : 4,114,493
DATED : September 19, 1978
INVENTOR(S) : Helmut Paulus

It is certified that error appears in the above-identified patent and that said Letters Patent are hereby corrected as shown below:

Column 1, line 58 "rotation" should read --rotating--.

Column 3, line 62 "the" should be inserted before --distance--.

Column 4, line 49 "contact" should be inserted after --prevent--.

Column 4, line 61 "ffrom" should read --from--.

Signed and Sealed this

Twenty-fourth Day of April 1979

[SEAL]

Attest:

RUTH C. MASON
Attesting Officer

DONALD W. BANNER
Commissioner of Patents and Trademarks